June 23, 1931.  T. W. W. FORREST  1,810,954
PRUNE PITTER
Filed Feb. 15, 1928  2 Sheets-Sheet 1

INVENTOR.
Thomas W. W. Forrest
BY Miller & Boyken
ATTORNEYS.

June 23, 1931.  T. W. W. FORREST  1,810,954
PRUNE PITTER
Filed Feb. 15, 1928  2 Sheets-Sheet 2
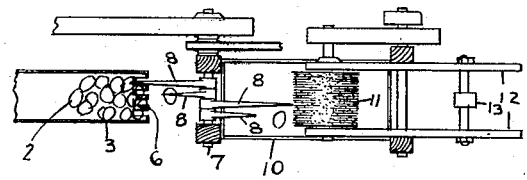
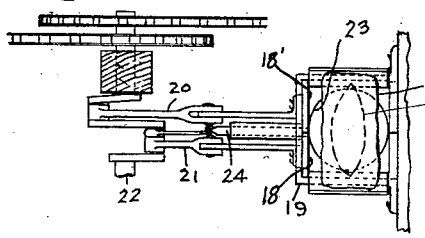
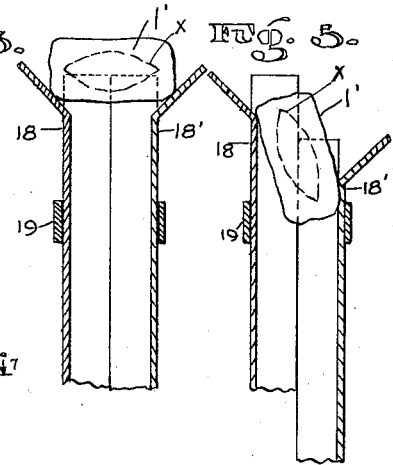
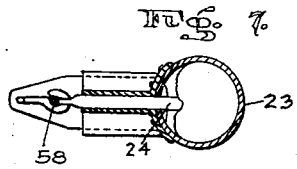
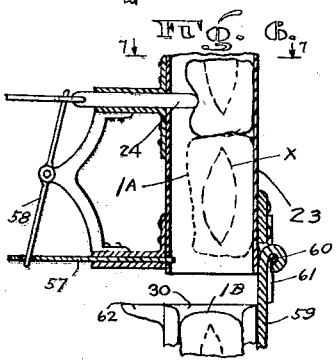
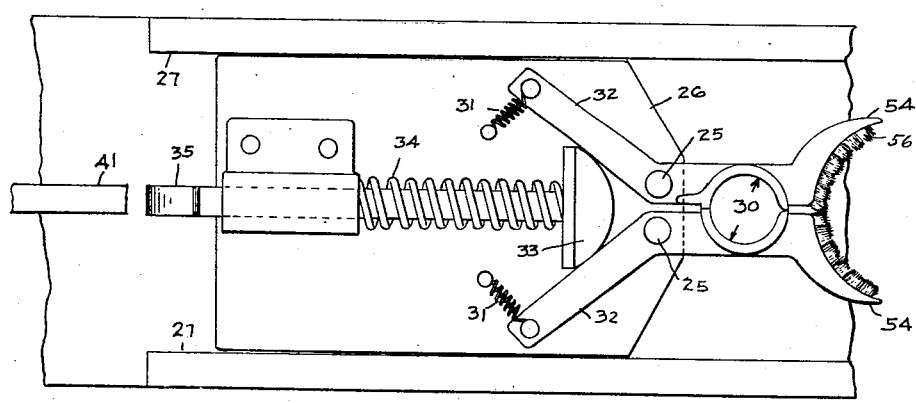
INVENTOR.
Thomas W. W. Forrest
BY Miller & Boyken
ATTORNEYS.

Patented June 23, 1931

1,810,954

UNITED STATES PATENT OFFICE

THOMAS W. W. FORREST, OF FRESNO, CALIFORNIA, ASSIGNOR TO SUN-MAID RAISIN GROWERS OF CALIFORNIA, OF FRESNO, CALIFORNIA, A COOPERATIVE ASSOCIATION OF CALIFORNIA

PRUNE PITTER

Application filed February 15, 1928. Serial No. 254,457.

This invention relates to apparatus for pitting fruit, and its objects are to provide means for pitting dried fruit such as dried prunes.

Dried prunes are not of uniform shape but as is well known are more or less deformed, wrinkled, often flat on one or more sides; due to the drying process and handling which they have received; and do not present symmetrical forms for pitting mechanically, hence it is one of the objects of the invention to provide means for shaping the fruit to semblance of symmetry before presenting it to the pitting elements.

Another object of the invention is to provide means for forcing out the pit from one end of the fruit without perforating the other end and with minimum injury to the fruit.

Other objects of the invention will appear in the following description.

Before passing the dried prunes through my apparatus it is desirable that they be processed to render them uniformly soft so that the machine elements can better operate thereon.

Briefly described my apparatus comprises means for feeding the dried prunes one at a time through a rolling device and thence to a chute through which they drop in single file to a holder for pitting.

While dropping through the rolling device the prunes are rolled to remove their deformities and render them substantially cylindrical with pits running lengthwise therein. The rolled prunes are then turned by the chute and fed endwise therethrough one at a time to a prune centering holder, the holder carries the prune away and presents it over a yielding orifice in a soft rubber block, a punch descends to press against the upper end of the prune (without puncturing the same) so as to force the point of the pit through the orifice, and a powerful suction sucks the pit out of the prune the remaining distance, the orifice closes, the pitted prune above is ejected and the operations repeated with another prune.

While I use the word "prune" in the above and following description, it is to be understood that the apparatus will work equally well on other dried whole fruit having similar characteristics including an elongated pit, such for instance as dried plums, dates, apricots, etc.

In the drawings accompanying this application Fig. 1 is a side elevation partly in section showing the whole machine.

Fig. 2 is a fragmentary plan view of the prune feeding portion of the machine.

Fig. 3 is a substantially full size section of a portion of the chute which longitudinally aligns the rolled prunes, and shows a prune as received thereby.

Fig. 4 is a plan view of Fig. 3 plus showing the hookup for operating the chute for aligning the fruit.

Fig. 5 is a similar view as per Fig. 3 but with the prune in the act of turning over for longitudinal alignment and descent in the chute.

Fig. 6 is a section of the lower end of the chute showing the stop pin which impinges one prune to hold it and the column above while permitting one prune only to escape below it to the pitting holder.

Fig. 7 is a cross-section of Fig. 6 as seen along the lines 7—7 thereof.

Fig. 8 is an enlarged plan view of the prune holder which receives the prunes one at a time from the lower end of the chute when discharged therefrom as shown in Fig. 6. In Fig. 8 parts of the machine immediately adjacent the prune holder are also shown.

Figure 1:
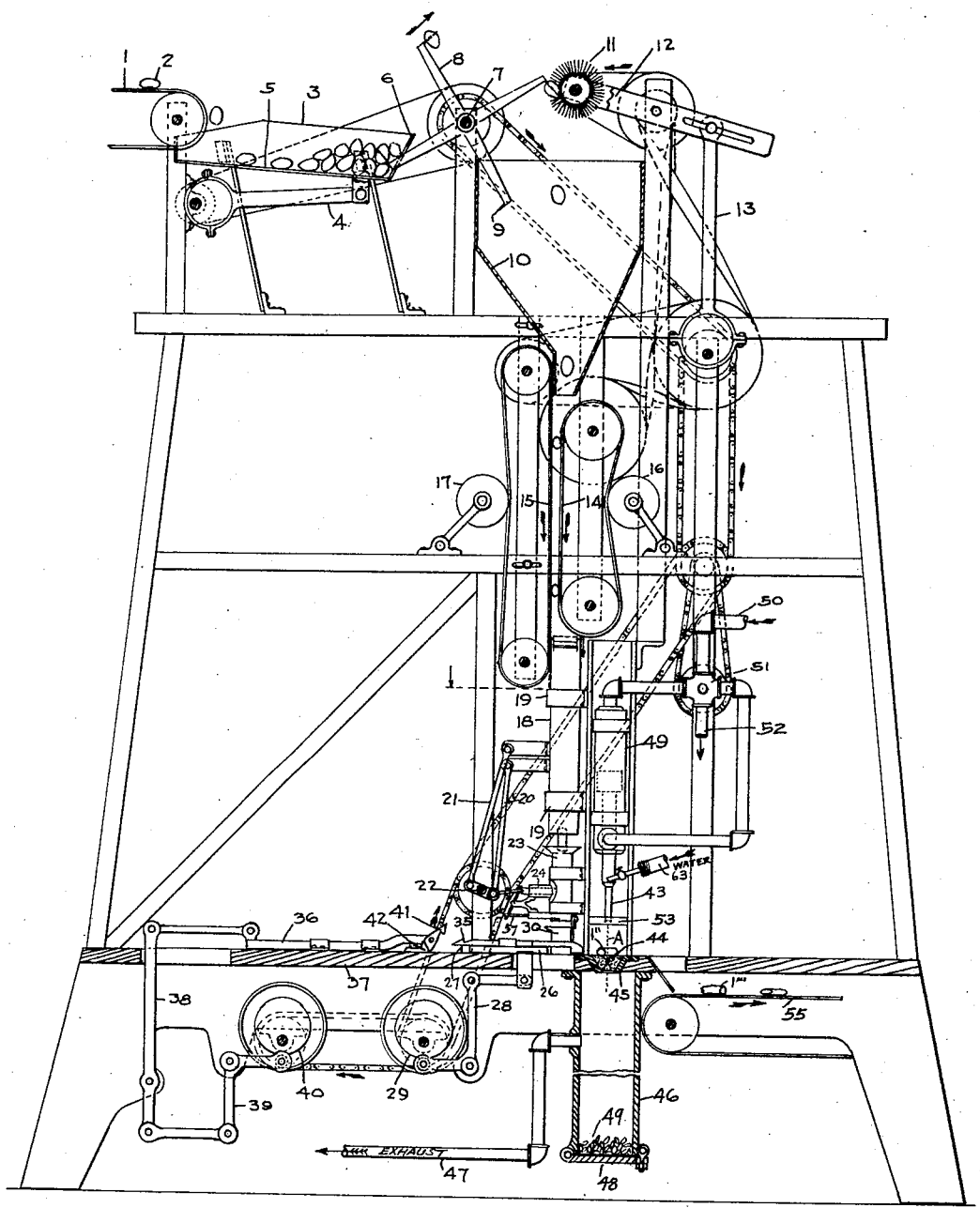

In further detail the drawings show at 1 a conveyor supplying the processed or softened dried prunes 2 to an oscillating receptacle 3.

This receptacle 3 is arranged at a slight angle and is oscillated like a shaker table by suitable means such as the eccentric device 4, and the bottom 5 of the receptacle is slotted and provided with upturned fingers 6 at its lower end so that the prunes will work their way down against these fingers and lie over the slots.

Revolvably mounted on a shaft 7 is a spider provided with offset arms 8 each arranged to pass through one of the slots in the receptacle. These arms each carry an impaling needle 9 which will impale the first prune it strikes and carry it out of the receptacle in direction of the arrow over a hopper 10.

Above the hopper is a revolving cylindrical brush 11 mounted on an oscillating arm 12 actuated by a crank 13 so driven and arranged that the brush descends in time with the advance of each impaled prune so as to travel somewhat faster and brush the prune from the needle into the hopper.

The prunes are thus positively fed at regular intervals one at a time to the hopper 10 for descent therethrough.

The lower end of the hopper converges and delivers the prunes between a pair of traveling belts 14—15.

The tension on these belts is controlled through means of idlers 16, 17. The belts are several inches wide and are spaced to put a gentle pressure on the prunes passing between them, and while the belts both travel in the same direction, their speeds are not the same, for either one; in this instance belt 15; travels faster than belt 14 so that the fruit is rolled between them and emerges at the bottom in cylindrical form with the long pit X of course arranged longitudinally, as the spacing of the belts precludes the prunes being rolled any other way.

The belts 14 and 15, it will be noticed, pass over pulleys which are not placed directly opposite one another, so that the fruit does not pass directly between opposed unyielding surfaces.

As the rolled prunes 1' emerge they lie with axes horizontally disposed and they fall single file into the upper flaring end of a chute 18 as best shown in Fig. 3.

The chute is divided along its vertical center line to form two independent halves 18 and 18' and they are slidably positioned in bearings or guides 19 so that the halves may be vertically reciprocated. To accomplish the vertical reciprocation of the chute sections they are connected by cranks 20—21 to opposite throws of a crank shaft 22 and are rapidly reciprocated in reverse directions.

The chute is square and the reciprocation of its sides causes the rolled prunes to turn over in the manner indicated in Fig. 5 and descend longitudinally.

The prunes emerge longitudinally from the reciprocating chute and fall through a round tube 23 which controls their delivery to the prune centering holder 30.

To effect a single delivery of the prunes from the lower end of tube 23 a reciprocating stop pin 24 is mounted in the side of tube 23 and is so positioned and actuated in time with all the elements of the machine that it gently presses against the side of each prune to stop it until the prune holder 30 is in position to receive it and at which time it is withdrawn to drop one prune and at once returned to hold the next.

At the lower end of the tube 23 is a sliding gate 57 actuated alternately with the stop pin 24 by any suitable means, such as the rocker arm 58 transmitting motion from the pin. This gate holds the prune released by the pin until the pin stops the next prune, and whereupon the gate slides outwardly to drop the freed prune into the centering holder 30. In Fig. 6 the dotted prune 1A indicates its position before dropping to position 1B into the holder or socket 30.

The centering prune holder comprises a pair of jaws 30 pivoted at 25 to a carriage 26 reciprocated horizontally in guides 27 by means of a crank 28 actuated by a cam 29 so formed as to bring the holder to a state of rest at each end of the stroke.

The jaws 30 are formed with a circular socket (see Fig. 8) to receive the prune from the tube 23, and which socket is normally open through pull of springs 31 on the ends of arms 32 extending rearwardly from the jaws, and the jaws are closed by means of a plunger 33 slidably mounted on the carriage 26 and urged forward by a spring 34. The plunger upon forward movement forces the arms 32 outward and closes the jaws as shown in Fig. 8 and releases arms 32 upon withdrawal.

The plunger is slidable independently of the carriage and the rear end of this plunger is formed with a hook 35 so that it may be pulled back to compress the spring 34 and permit closing of the jaws 30.

To pull back the plunger 33 at the required intervals a rod 36 is slidably mounted on the bed 37 of the machine and is reciprocated by means of a lever 38 oscillated by means of a crank arm 39 operated by a suitable rotating cam 40. The forward end of slidable rod 36 is fitted with a tripping hook 41 which is adapted to automatically engage the plunger hook 35 at the forward end of the stroke and be tripped therefrom by a trip 42 at the rearward end of the stroke. Cams 29 and 40 are driven in time by chain or gears and they are so proportioned that the carriage 26 is reciprocated with a pause at the rearward or prune receiving position and also at the forward or prune pitting end of its stroke, while hook 41 advances quickly to engage hook 35 just before the return movement of the carriage and recedes faster than the carriage so as to at once open the jaws 30 after pitting of the fruit, and hold them open until the rear end of the carriage stroke is reached and the next prune is dropped from the tube 23 to the holder. At this instant hook 41 is tripped free of hook 35, the plunger shoots forward through action of spring 34 and the jaws snap tightly around the prune, and the carriage again advances to carry the prune to pitting position at the forward end of the carriage stroke.

Since the jaws are open at the forward side at the moment of receiving a prune from the tube 23, means is provided to temporarily close the opening so that the fruit will not fall out until the socket closes upon it. Such means is here shown as a small plate 59 swingingly hinged at 60 to the tube 23 and fitted with a light spring 61 so that it will be gently pressed against the socket 30 to thereby close its open side when in prune-receiving position as shown in Figs. 1 and 6. This plate permits free closing of the jaws as it is positioned just against the outside of the socket portion, and it will lift and ride over the socket at each forward movement thereof. The socket is rearwardly extended at one side as at 62 to prevent the plate falling in back of it at the advanced position of the holder.

The socket in tightly closing upon the previously rolled prune, further squeezes it so as to shape it and accurately center it with respect to its pit.

When at the forward end of its stroke the carriage aligns the prune in the holder with pitting axis A directly under a pitting punch 43 and over the center of a soft rubber block 44.

This soft rubber block 44 is preferably set in a metal socket 45 so as to be removable therewith from the bed of the machine and the rubber block is thinner in its center and is pierced though tightly closed, as its object is to open sphincter-like to permit passage of each pit while closing tightly about and behind it.

Under the soft rubber block is arranged a vacuum cylinder 46 in which a high degree of exhaustion is maintained through a pipe 47 extending to any suitable exhaust pump not shown.

Cylinder 46 is relatively long, and is provided at its lower end with an air-tight door 48 which may be opened from time to time for discharge of fruit pits 49 which accumulate within.

Punch 43 is not a perforating punch, but it merely compresses the upper end of the prune downwardly until the lower end of the pit is forced through the resilient rubber sphincter washer 44 to protrude into the vacuum chamber below whereupon the pit is at once sucked into the chamber and during which the sphincter closes around the pit clearing all meat therefrom and sealing itself after passage of the pit therethrough.

Punch 43 is mounted at the lower end of a piston in cylinder 49 actuated by compressed air from a pipe 50 controlled by a four way valve 51 exhausting at 52.

Valve 51 is preferably of the rotary type and is actuated by suitable gearing in time with the reciprocating prune holder so as to cause the punch 43 to descend the moment the prune is in position beneath it.

The reason for actuating the punch with compressed air is that it gives a yielding blow to the punch and thereby compensates for the differences in pits and the slight time variations in forcing them through the rubber washer, and has been found to cause much less injury to the fruit than a rigidly actuated punch, as it should be remembered that the fruit should preferably remain unbroken at its point of contact with the punch. The punch is slightly concave at its lower end to better center itself over the pit within the fruit.

Upon withdrawal of the punch the fruit may have a tendency to be carried upwardly due to the punch forming a small depression in the fruit, and a stripper 53 is provided so that the fruit will remain on top of the rubber block 44 upon recession of the holder 30, as shown at 1''.

The forward ends of the holder jaws 30 are flared as at 54 so as to form a pusher to push the previously pitted prune from the rubber block 44 upon the next forward movement of the carriage, and the ends are preferably fitted with a brush 56 directed downwardly so as to brush off any accumulation from the rubber washer. Also, a water drip is maintained on the punch from a pipe as at 63 to reduce the tendency of punch to stick to the fruit, and also to keep the rubber washer moist so that it will clean easier with brush 55, besides acting to improve the seal of this washer in closing after each pit is forced through. The pitted prunes 1'' fall to any suitable receiver, or to a conveyor 55 for carrying away from the machine, as shown at 1'''.

In operation all of the moving elements of the machine are operated in time with one another by suitable gears, chain drives, or link connections as variously indicated in the drawings and as well understood without further description to unnecessarily encumber the specification.

I claim:

1. A holder arranged and adapted to hold a drupaceous fruit body, a soft rubber member, means for presenting said holder against one side of said member with one end of the fruit thereagainst, and means operative against the opposite end of the fruit for pushing the end of the pit of the fruit through said member and suction means active on the opposite side of said member arranged to draw the pit therethrough.

2. A holder arranged and adapted to hold a drupaceous fruit body, a soft rubber member, means for presenting said holder against one side of said member with one end of the fruit thereagainst, and means operative against the opposite end of the fruit for pushing the end of the pit of the fruit through said member, a receptacle air-sealed to said member and into which the pit is adapted to fall, and means for creating a partial vacuum in said receptacle.

3. A holder arranged and adapted to hold a drupaceous fruit body, a soft rubber member, means for presenting said holder against one side of said member with one end of the fruit thereagainst, and means operative against the opposite end of the fruit for pushing the end of the pit of the fruit through said member, a receptacle air-sealed to said member and into which the pit is adapted to fall, and means for creating a partial vacuum in said receptacle and means for discharging accumulated pits from said receptacle.

4. A holder arranged and adapted to hold a drupaceous fruit body, a soft rubber member, means for presenting said holder against one side of said member with one end of the fruit directly thereagainst, and resiliently actuated means operative against the opposite end of the fruit for pushing the end of the pit of the fruit through said member.

5. In a drupaceous fruit pitter, a soft resilient rubber member, means for presenting a drupe with one end against said member, means for forcing the pit partly through the member, and suction means arranged and adapted for sucking the pit the remaining distance through the member.

6. A holder arranged and adapted to hold a drupaceous fruit body, a soft rubber member, means for presenting said holder against one side of said member with one end of the fruit thereagainst, and means operative against the opposite end of the fruit for pushing the end of the pit of the fruit through said member comprising a punch, a reciprocable piston to which said punch is secured, a cylinder in which said piston is mounted, and means for admitting air under pressure to and for operating said piston.

7. In a drupaceous fruit pitter, a reciprocably mounted fruit holder provided with a socket adapted to hold one fruit body and formed of two confronting jaws, means for reciprocating said socket, means for opening and closing the jaws of said socket at opposite ends of its travel respectively, means for placing a drupe in said holder at one end of its travel and means for expelling the pit of the drupe at the other end of its travel.

8. In a drupaceous fruit pitter, a reciprocably mounted fruit holder provided with a socket adapted to hold one fruit body, means for reciprocating said socket, means for opening and closing said socket respectively at opposite ends of its travel, means for placing a drupe in said holder at one end of its travel and means for expelling the pit of the drupe at the other end of its travel, the means for opening said socket operating to deposit the pitted drupe adjacent the holder after the pitting thereof, and said holder formed to push away the pitted drupe at its next stroke.

9. In a drupaceous fruit pitter, a soft resilient rubber member, means for presenting a drupe with one end against said member, means for forcing the pit partly through the member, and suction means arranged and adapted for sucking the pit the remaining distance through the member and means for moistening said drupe preparatory to pitting.

10. In a drupaceous fruit pitter, a soft resilient rubber member, means for presenting a drupe with one end against said member, means for forcing the pit partly through the member, and suction means arranged and adapted for sucking the pit the remaining distance through the member and means for moistening said drupe preparatory to pitting and for moistening said rubber member.

11. In the combination expressed in claim 7, said socket formed to open like a pair of pipe pliers, and means provided for temporarily closing the gap in the socket while introducing the drupe in said socket.

12. In a fruit pitting machine, a support for the fruit during the pitting operation comprising a block of soft rubber of sufficient thickness to resist the pitting pressure and provided with a sphincter-like opening through which the pit passes, adapted to close substantially air-tight after passage of the pit.

13. In a fruit pitting machine, a support for the fruit during the pitting operation comprising a block of soft rubber of sufficient thickness to resist the pitting pressure and provided with a pit-passing aperture, and a rigid cup in which the rubber block is mounted.

THOMAS W. W. FORREST.